(No Model.)
J. A. DUBBS.
DESULPHURIZING OILS.
No. 470,911. Patented Mar. 15, 1892.
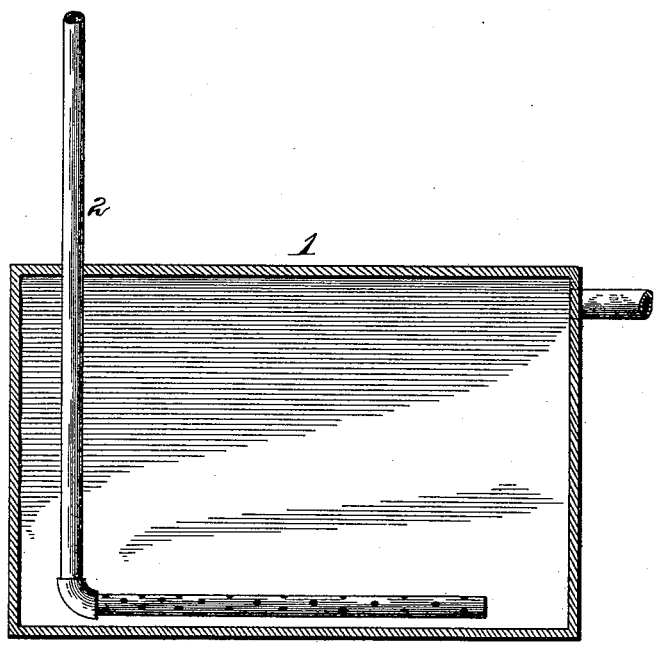
Witnesses:
F. L. Ourand
W. L. Coombs
Inventor:
Jesse A. Dubbs,
by Davis Dagger & Co.
Attorneys.

UNITED STATES PATENT OFFICE.

JESSE A. DUBBS, OF ALLEGHENY, PENNSYLVANIA, ASSIGNOR OF ONE-HALF TO SAMUEL M. BOYD, OF SAME PLACE.

DESULPHURIZING OIL.

SPECIFICATION forming part of Letters Patent No. 470,911, dated March 15, 1892.

Application filed July 20, 1891. Serial No. 400,124. (No specimens.)

*To all whom it may concern:*

Be it known that I, JESSE A. DUBBS, a citizen of the United States, and a resident of Allegheny, in the county of Allegheny and State of Pennsylvania, have invented a certain new and useful Improvement in Desulphurizing Oils; and I do hereby declare that the following is a full, clear, and exact description of the invention, which will enable others skilled in the art to which it appertains to make and use the same, reference being had to the accompanying drawing, which forms a part of this specification.

My invention relates to an improved process of desulphurizing crude Lima oils or other mineral oils containing a large percentage of sulphur.

In distilling or refining Lima or the sulphur petroleum oils indestructible carbon sulphides are formed, which pass off with the vapor or distillate to the condenser, rendering the distilled oil of an inferior quality. The presence of sulphur in the residue after distillation also renders the lubricating-oils, tar, and other by-products of less commercial value than the residue from non-sulphur oils.

Heretofore it has been proposed to treat the vapors arising from the distillation of the above-named oils by subjecting the same to the action of hydrogen gas for the purpose of removing the sulphur. This process, however, is only partially effective, as the carbon sulphides, being formed before coming in contact with the gas, will not combine with hydrogen, or, at best, to a limited extent only. Again, the vapor of the oil only being subjected to the action of the gas, there will be a larger percentage of sulphur remaining in the residue, by which the value thereof is greatly reduced.

The object of my invention is to eliminate the sulphur from the crude oil before distillation, thus freeing both the refined oil and and the residue after distillation of its deleterious presence.

The invention consists in desulphurizing crude Lima and other mineral oils containing a large percentage of sulphur by forcing through the same a gas rich in hydrogen, whereby the sulphur in the oil will unite with the hydrogen of the gas, passing off in the form of incondensable sulphureted hydrogen and preventing the formation of indestructible and deleterious carbon sulphides.

In the accompanying drawing I have represented in sectional elevation a form of apparatus for carrying my invention into effect.

In the said drawing, the reference-numeral 1 designates a vessel or still of any suitable construction for containing the oil to be heated, and 2 a pipe leading thereto from any suitable source of gas-supply. This pipe should be provided with a number of perforations, so that the gas forced therethrough will permeate the oil and, combining with the sulphur therein, will pass off as sulphureted hydrogen. It is preferable to have the gas in a heated condition before entering the desulphurizing-vessel, as its action will be more efficient in this condition.

I am aware that heretofore different gases—such as carbonic acid, carbonic oxide, and hydrogen gases—have been forced into stills containing non-sulphur oils during the process of distillation for the purpose of agitating the oil. In this case, however, the gases have no chemical action upon the oil, but simply act mechanically thereon and pass off to the condenser in the same form in which they were introduced, being collected therein so as to be used over and over again. By my process sulphur-oils are subjected to the action of hydrogen gas, which combines chemically with the sulphur and forms incondensible sulphureted hydrogen gas. It has also been proposed to subject non-sulphur oil to the action of heated natural gas for the purpose of rendering the same limpid and precipitating water and impurities contained therein. In this case, also, no chemical reaction takes place and is therefore different from my process.

Having thus described my invention, what I claim is—

The process herein described of desulphurizing crude Lima and other mineral oils containing a large percentage of sulphur, which consists in forcing through the same before distillation a gas rich in hydrogen, whereby the sulphur in the oil will unite with the hydrogen of the gas passing off in the form of incondensable sulphureted hydrogen and preventing the formation of indestructible and deleterious carbon sulphides, substantially as set forth.

In testimony that I claim the foregoing as my own I have hereunto affixed my signature in presence of two witnesses.

JESSE A. DUBBS.

Witnesses:
J. J. McCORMICK,
J. P. BINGAMAR.